(12) United States Patent
Lung et al.

(10) Patent No.: US 7,549,481 B2
(45) Date of Patent: Jun. 23, 2009

(54) PARALLEL LINK MOUNTING ARM FOR A FURROW OPENER

(75) Inventors: Devin Lung, St. Brieux (CA); Mark Cresswell, St. Brieux (CA)

(73) Assignee: Bourgault Industries Ltd., St. Brieux, Saskatchewan (CA)

( * ) Notice: Subject to any disclaimer, the term of this patent is extended or adjusted under 35 U.S.C. 154(b) by 0 days.

(21) Appl. No.: 12/057,922

(22) Filed: Mar. 28, 2008

(65) Prior Publication Data

US 2008/0308024 A1    Dec. 18, 2008

(30) Foreign Application Priority Data

Jun. 12, 2007   (CA) ..................................... 2591379

(51) Int. Cl.
  *A01B 5/00*  (2006.01)
  *A01B 49/02* (2006.01)
  *A01C 5/00*  (2006.01)
  *A01C 13/00* (2006.01)

(52) U.S. Cl. .......................... 172/175; 111/156; 111/194

(58) Field of Classification Search .................... 111/79, 111/80, 186–188, 194, 195, 149, 151–156; 172/175
See application file for complete search history.

(56) References Cited

U.S. PATENT DOCUMENTS

| 4,760,806 | A  | 8/1988  | Bigbee         |
| 5,161,472 | A  | 11/1992 | Handy          |
| 5,333,559 | A  | 8/1994  | Hodapp et al.  |
| 5,351,635 | A  | 10/1994 | Hulicsko       |
| 5,396,851 | A  | 3/1995  | Beaujot        |
| 5,520,125 | A  | 5/1996  | Thompson       |
| 5,562,054 | A  | 10/1996 | Ryan           |
| 5,609,114 | A  | 3/1997  | Barton         |
| 6,325,156 | B1 | 12/2001 | Barry          |
| 6,408,772 | B1 | 6/2002  | Lempriere      |
| 7,159,523 | B2 | 1/2007  | Bourgault et al. |

*Primary Examiner*—Christopher J. Novosad
(74) *Attorney, Agent, or Firm*—Frost Brown Todd LLC

(57) ABSTRACT

A trailing arm furrow opener apparatus includes a furrow opener bracket attached to the rear link of a parallel link assembly such that the furrow opener bracket and furrow opener attached thereto is maintained in a constant fore and aft angular orientation as the assembly moves up and down. A pucker wheel arm is fixed to one of the upper and lower parallel arm members of the parallel link assembly, and extends rearward from the rear link, and a packer wheel is mounted to the packer wheel arm. A bias device exerts a downward force on the assembly. The presentation angle of the furrow opener with respect to the ground is maintained constant while the assembly moves up and down.

23 Claims, 7 Drawing Sheets

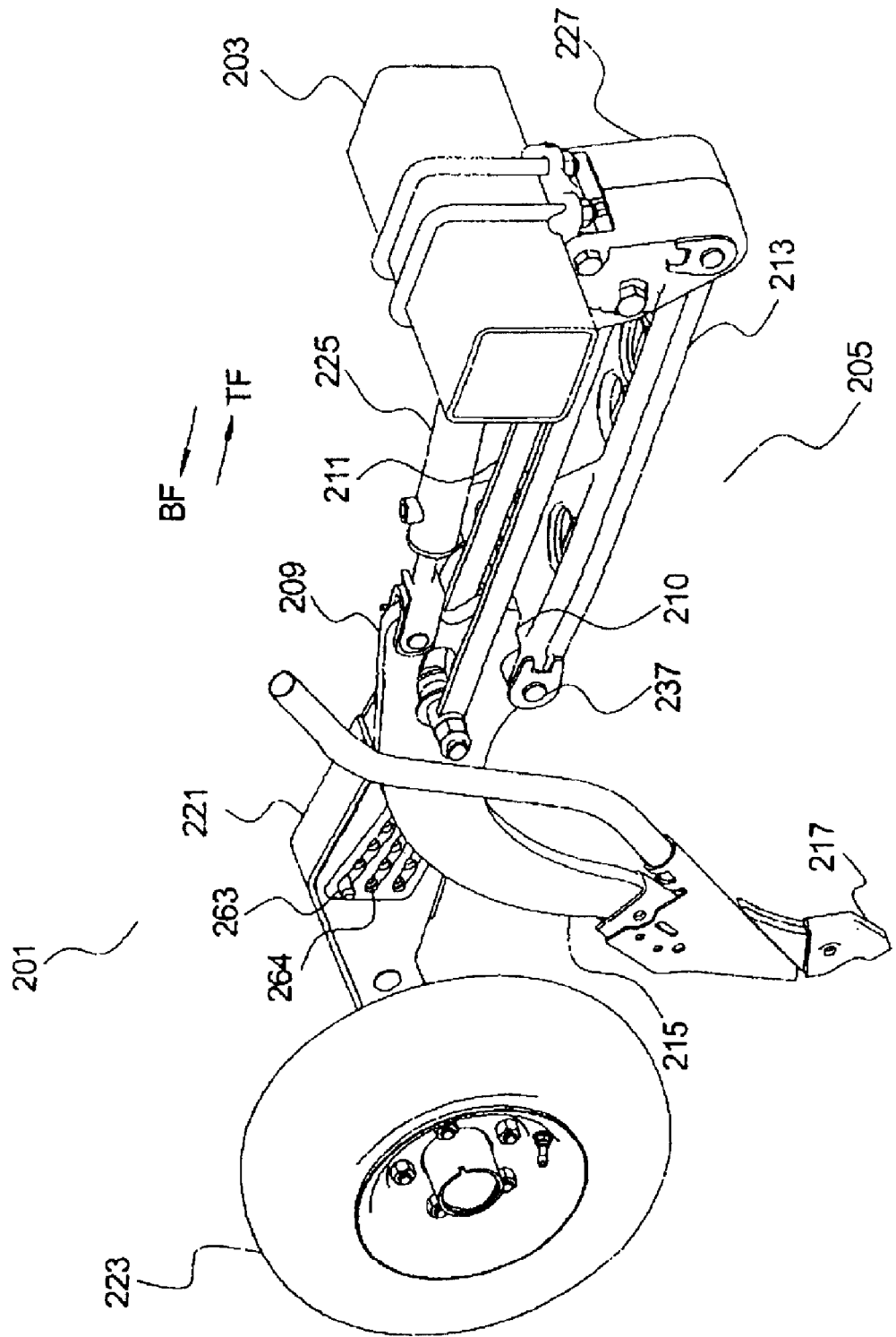

PARALLEL LINK MOUNTING ARM FOR A FURROW OPENER

This invention relates to agricultural seeding implements and in particular to a mounting arm for a furrow opener on a seeding implement.

BACKGROUND

Agricultural seeders are used to place seed and fertilizer in the soil to plant a crop. It is necessary to place the seed at a substantially consistent depth beneath the surface of the soil. Opener arms of various configurations typically extend downward from the seeder frame and a furrow opener is mounted on the opener arm and adapted to engage the soil to make a furrow into which the seed is deposited. Typically the furrow opener pushes soil to one or both sides and seed is deposited close behind the furrow opener so that the pushed aside soil can then fall back in on top of the seed. A packer wheel is typically provided following the furrow opener and oriented to roll over the furrow to pack the soil that has fallen back over the seed and encourage seed germination.

The desired seed depth is typically relatively shallow, from less than one inch with some seeds and soil conditions up to three inches or more in others. Since agricultural seeders are commonly 50 or more feet wide and can include 60 or more individual furrow openers, consistently maintaining seed depth for each furrow opener in a range of fractions of an inch presents a considerable challenge.

In order to maintain consistent seed depth, it is known to pivotally attach the front end of a trailing arm to the seeder such that same extends generally rearward and downward from the frame and can pivot up and down with respect to the seeder frame. A packer wheel is then rotatably attached to support the rear end of the trailing arm. A furrow opener is attached to the trailing arm ahead of the packer wheel such that the vertical position of the bottom of the furrow opener with respect to the bottom of the packer wheel can be fixed at a desired location to set the depth of the furrow. A bias element is provided to force the trailing arm downward to push the furrow opener into the soil and force the packer wheel against the ground. These furrow opener assemblies are spaced laterally along tile width of the implement by mounting the front ends of the trailing arms to lateral frame members of the implement.

The packer wheel pushes down the soil over the seed in the furrow and the bottom of the packer wheel corresponds to the soil surface. The depth of the furrow is substantially determined by the vertical distance that the bottom end of the furrow opener extends below the bottom of the packer wheel. Such a trailing arm furrow opener assembly is disclosed for example in U.S. Pat. No. 7,159,523 to Bourgault et al. particularly in FIG. 1 thereof. U.S. Pat. Nos. 5,396,851 to Beaujot and 5,609,114 to Barton disclose trailing arm furrow opener assemblies that operate in a similar way.

A problem occurs with trailing arm furrow opener assemblies such as that of Bourgault, Barton, and Beaujot in uneven terrain where the distance between the frame and the ground varies. As the vertical distance of the frame above the ground varies the trailing arm moves up and down about its pivotal attachment to the seeder and the angle of the trailing arm changes such that the distance from the middle portion of the arm, where the furrow opener is attached, to the ground varies, and thus the actual depth of the seed furrow varies.

To improve the consistency of the furrow depth Bourgault et al. also disclose, in FIGS. 5-9 of U.S. Pat. No. 7,159,523, a trailing arm formed by upper and lower parallel arms connected at each end by front and rear links. Such a parallel link assembly has the property that the rear link is maintained in a constant horizontal and vertical orientation through the vertical range of motion without tilting forward or rearward. The front link thereof is fixed to the implement frame and the rear packer wheel and the furrow opener are fixed to the rear link. Thus as the packer wheel moves up and down relative to the frame in uneven terrain, the packer wheel and furrow opener move together vertically and so the furrow depth is maintained at a constant depth.

In some conditions it has been found when using parallel link trailing arm furrow opener assemblies that the direct relationship between vertical movement of the furrow opener and the packer wheel is detrimental to accurate seed placement. For example where the soil is hard and lumpy the packer wheel experiences excessive and erratic vertical movement. When the packer wheel rolls up and over a hard lump of soil, the furrow opener also moves up the same amount, and thus can be pulled out of the ground entirely.

In the conventional trailing arm furrow opener assembly where the furrow opener moves vertically as the packer wheel moves vertically, but a lesser distance vertically, this problem is reduced. Thus in some conditions the conventional trailing arm has advantages over the parallel link trailing arm, and in other conditions the opposite is true.

SUMMARY OF THE INVENTION

It is an object of the present invention to provide a trailing arm furrow opener apparatus that overcomes problems in the prior art.

As discussed above, in the parallel link trailing arm the rear link is maintained in a constant vertical and horizontal orientation through the vertical range of movement. Thus when the packer wheel and furrow opener are attached to the rear link, they move up and down together, maintaining a consistent vertical distance between the bottom of the furrow opener and the bottom of the packer wheel. While this relationship is advantageous in some conditions, it has disadvantages in others.

Attaching the furrow opener to the rear link of a parallel link assembly also substantially fixes the fore and aft presentation angle of the furrow opener with respect to the ground. This presentation angle affects the operation of a furrow opener. There are a wide variety of furrow openers and each is designed to be mounted to a furrow opener shank in cooperation with a tube carrying agricultural products such as seed and fertilizer to open a furrow such that the agricultural product will be deposited into the correct location in the furrow.

Furrow openers typically include a pointed front end or tip that is oriented to engage the soil and draw the furrow opener into the soil. The product tube deposits agricultural product generally behind the tip after the furrow has been formed and before the soil moved aside to create the furrow can drop back into the furrow so that the product is at the bottom of the furrow, and the soil falls back on top of the product. Some furrow openers make more than one furrow, with product divided between the furrows, or with different product directed to each furrow.

Thus as the fore and aft presentation angle changes, the angular relationship between the furrow opener and the soil, which dictates the form of the furrow made, and the relationship between the furrow opener and the product tube, which dictates the location of the agricultural product in the furrow, changes as well. In a conventional trailing arm furrow opener assembly, as the arm moves up and down with respect to the frame, the presentation angle changes. The presentation angle also changes as the operator adjusts the furrow opener assembly to move the furrow opener up and down relative to the packer wheel to change the depth of the furrow for different products or soil conditions. Thus the furrow opener being used must be designed to operate satisfactorily within a contemplated range of presentation angles that the opener will encounter during use.

The parallel link trailing arm with the furrow opener and packer wheel attached to the rear link thus allows for greater precision of operation by maintaining a substantially constant presentation angle during operation, but has disadvantages as described above.

The trailing arm furrow opener apparatus of the present invention therefore provides a trailing arm furrow opener apparatus where only the furrow opener is attached to the rear link of a parallel link assembly, and the packer wheel is fixed to one of the parallel arms of the parallel link assembly. Thus the packer wheel is attached to the implement frame on a conventional straight trailing arm and operates in the same manner as the conventional trailing arm. The furrow opener moves up and down with the middle portion of the arm so as the packer wheel moves vertically relative to the frame in rolling terrain, the furrow opener also moves vertically, but a lesser distance vertically. Since the furrow opener itself is, however, rigidly oriented with respect to the rear link, the vertical and horizontal orientation of the furrow opener, and therefore its presentation angle with respect to the soil, is substantially constant as it moves up and down on the parallel link.

In the prior art, in order to maintain the presentation angle in an acceptable range in rolling terrain, the front end of the trailing arm is maintained at a generally constant vertical elevation above the ground, often by mounting the implement frame on fixed wheels. The relative vertical positions of the furrow opener and packer wheel on each furrow opener assembly is adjusted to change the depth of the furrow.

In contrast, the present furrow opener apparatus can be mounted to an implement where the wheels move up and down with respect to the frame to raise and lower the implement frame with respect to the ground. Varying the vertical position of the frame will correspondingly vary the depth of the furrow, while the presentation angle of the furrow opener remains constant.

The present invention thus provides in a first embodiment a furrow opener apparatus adapted for attachment to a lateral frame member of an implement for travel over the ground in an operating travel direction. The apparatus comprises a parallel link assembly comprising a front link adapted for substantially fixed attachment to the lateral frame member, a rear link, and upper and lower parallel arm members pivotally attached to the front and rear links such that, in a working mode, the rear link is maintained in a substantially constant fore and aft angular orientation as the upper and lower arm members pivot up and down about the front link A furrow opener bracket is attached to the rear link, and a furrow opener is attached to a lower portion of the furrow opener bracket, the furrow opener operative to form a furrow when a bottom end thereof is engaged in the ground. A packer wheel arm is fixed to one of the upper and lower parallel arm members and extends rearward from the rear link, and a packer wheel is rotatably mounted to a rear portion of the packer wheel arm such that the packer wheel is substantially aligned with the furrow opener. A bias device is operative to exert a downward bias force on the parallel link assembly when in the working mode. The furrow opener is maintained in substantially rigid orientation with respect to the rear link when in the working mode, and a vertical operating position of the furrow opener with respect to the packer wheel is adjustable to vary a depth of a corresponding furrow.

The present invention provides in a second embodiment a seeding implement apparatus adapted for travel over the ground in an operating travel direction. The apparatus comprises a lateral frame member, a front link substantially fixed to the lateral frame member, a rear link, and upper and lower parallel arm members pivotally attached to the front and rear Jinks such that, in a working mode, the rear link is maintained in a substantially constant fore and aft angular orientation as the upper and lower arm members pivot up and down about the front link. A furrow opener bracket is attached to the rear link, and a furrow opener is attached to a lower portion of the furrow opener bracket. The furrow opener is operative to form a furrow when a bottom end thereof is engaged in the ground. A packer wheel arm is fixed to one of the upper and lower parallel arm members and extends rearward from the rear link, and a packer wheel is rotatably mounted to a rear portion of the packer wheel arm such that the packer wheel is substantially aligned with the furrow opener. A bias device is operative to exert a downward bias force on the parallel link assembly when in the working mode. The furrow opener is maintained in substantially rigid orientation with respect to the rear link when in the working mode.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 7 is a front right isometric view of the embodiment of FIG. 5 shown in the transport position.

DETAILED DESCRIPTION OF THE ILLUSTRATED EMBODIMENTS

Figure 1:
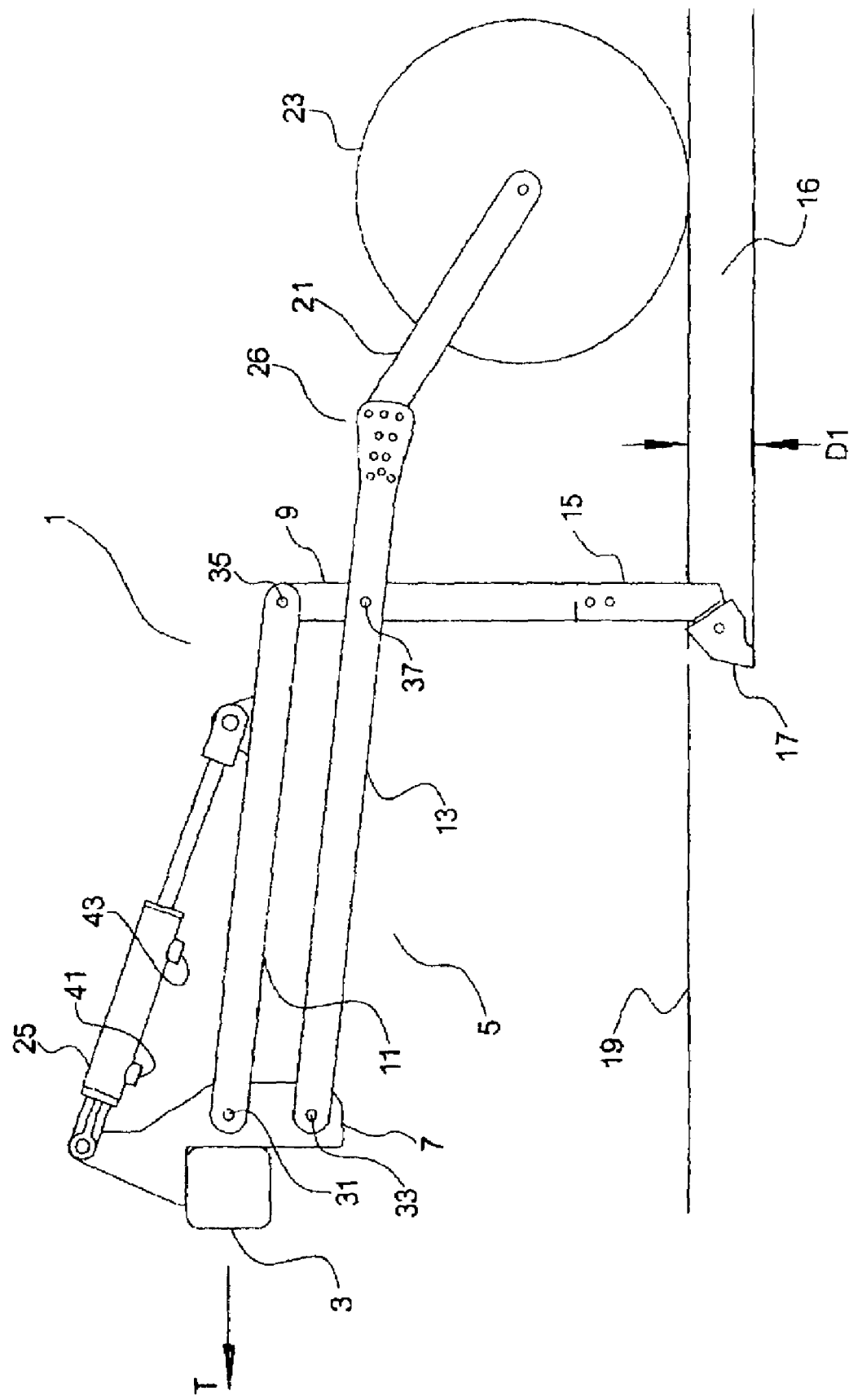
FIG. 1 is a schematic side view of an embodiment of the furrow opener apparatus of the present invention in a working mode making a furrow.
Figure 2:
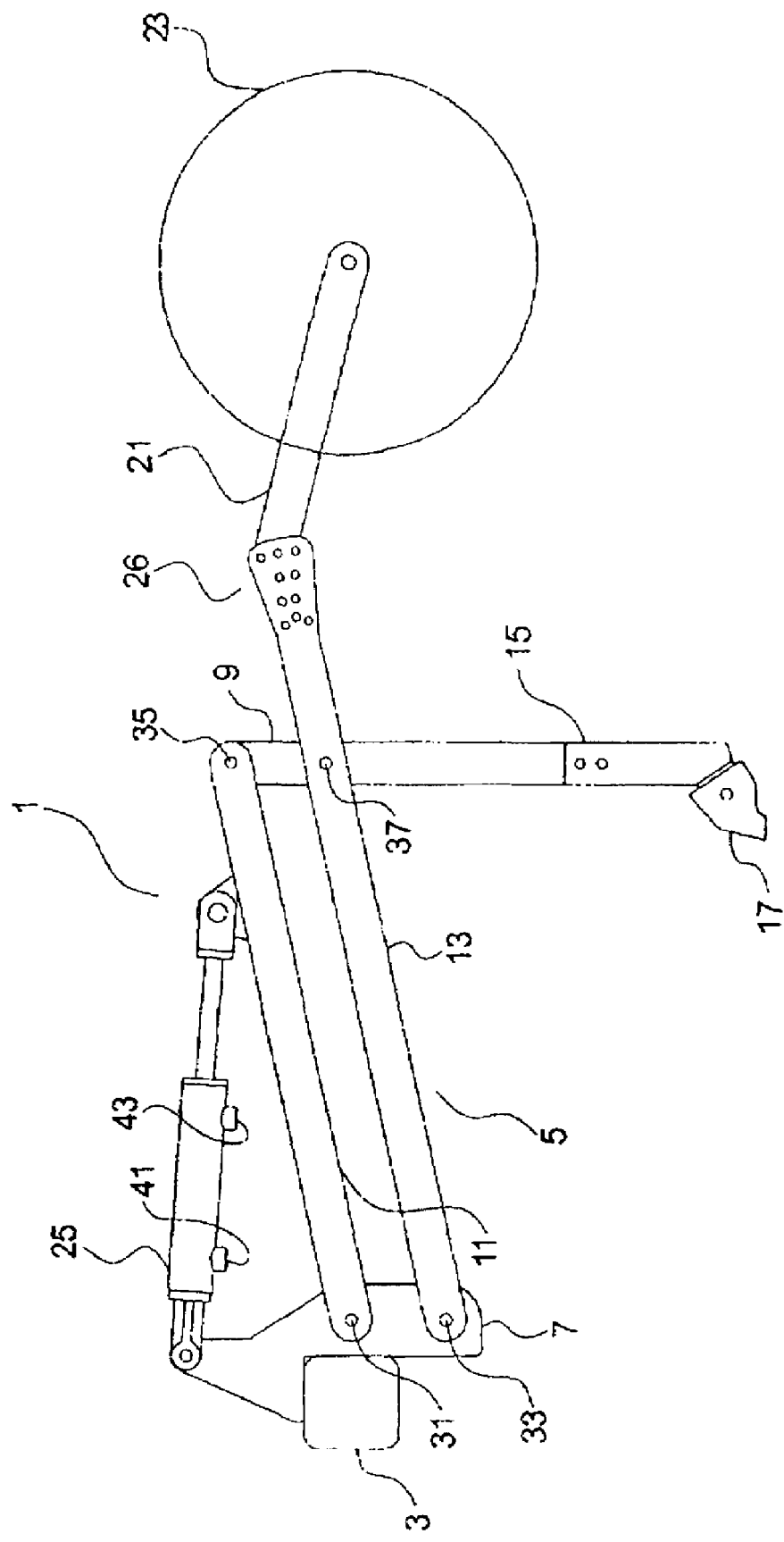
FIG. 2 is a schematic side view of the embodiment of FIG. 1 in a transport mode.

FIGS. 1 and 2 schematically illustrate a furrow opener apparatus 1 of the present invention adapted for attachment to a lateral frame member 3 of an implement frame mounted on wheels or the like for travel over the ground in an operating travel direction T. The apparatus 1 comprises a parallel link assembly 5 comprising a front link 7 adapted for substantially fixed attachment to the lateral frame member 3 and a rear link 9. Upper and lower parallel arm members 11, 13 are pivotally attached to the front and rear links 7, 9 such that the rear link 9 is maintained in a substantially constant fore and aft angular orientation as the upper and lower arm members 11, 13 pivot up and down with respect to the frame 3 about the front link 7.

The front link 7 defines upper and lower front pivot axes 31, 33 and the rear link 9 defines upper and lower rear pivot axes 35, 37, and the attachment to the lateral frame member 3 is such that the upper and lower front and rear pivot axes 31, 33, 35, 37 are oriented substantially horizontal and perpendicular to the operating travel direction T. The upper arm member 11 is pivotally attached to the front link 7 about the upper front pivot axis 31 and pivotally attached to the rear link 9 about the upper rear pivot axis 35. The lower arm member 13 is pivotally attached to the front link 7 about the lower front pivot axis 33 and is pivotally attached to the rear link: 9 about the lower rear pivot axis 37 such that the upper and lower arm members 11, 13 are oriented substantially parallel to each other.

Thus when the parallel arm members 11, 13 move up and down the rear link 9 is maintained in the substantially the same fore and aft angular orientation through the vertical range of motion without tilting forward or rearward.

A furrow opener bracket 15 is attached to the rear link 9, and a furrow opener 17 is attached to the lower portion of the furrow opener bracket 15 and is operative to form a furrow 16 when the bottom end thereof is engaged in the ground 19. In the simple embodiment illustrated schematically in FIG. 1, the rear link 9 is provided by extending the furrow opener bracket 15 upward, thus illustrating clearly that the furrow opener bracket 15 and furrow opener 17 are fixed to the rear link 9 and are maintained in a constant fore and aft orientation as the parallel link assembly 5 moves up and down.

A packer wheel arm 21 is attached to the lower parallel arm member 13 and extends rearward from the rear link 9. A packer wheel 23 is rotatably mounted to a rear portion of the packer wheel arm 21 such that the packer wheel 23 is substantially aligned with the furrow opener. In the simple embodiment illustrated schematically in FIG. 1, the packer wheel arm is provided by extending the lower parallel arm member 13 rearward, thus illustrating clearly that the packer wheel arm 21 is fixed to one of the upper and lower parallel arm members 11, 13. Since these members 11 and 13 remain parallel during use it can be seen that the packer wheel arm 21 can be fixed to either member 11, 13 and function as required. An adjustment mechanism 26 can be provided to allow the position of the packer wheel arm 21 with respect to the lower parallel arm member 13 to be adjusted to adjust the depth of the furrow.

A bias device, illustrated as a hydraulic cylinder 25, is operative to exert a downward bias force BF on the parallel link assembly 5. The hydraulic cylinder 25 in the illustrated embodiment is connected to an active hydraulic source at a first port 41 thereof when in working mode. The active hydraulic source is operative to maintain a desired pressure in the hydraulic cylinder 25 to exert a desired downward bias force BF on the parallel link assembly 5 while allowing the hydraulic cylinder 25 to extend and retract in response to forces exerted on the parallel link assembly 5.

The hydraulic cylinder is connected to the active hydraulic source at a second port 43 thereof when in transport mode such that the active hydraulic source is operative in transport mode to raise the parallel link assembly 5 to a transport position as illustrated in FIG. 2.

Thus the furrow opener apparatus 1 can be mounted to an implement having a frame mounted on fixed wheels since the hydraulic cylinder 25 is operative to raise the furrow openers for transport. The apparatus 1 could also be mounted to an implement where the wheels move up and down with respect to the frame to raise and lower the frame and furrow openers between various vertical working positions and the transport position. Further advantages of such an implement are discussed below. The bias element of the furrow opener apparatus 1 of the invention could then be provided by a spring or the like, since it would not be required to exert an upward force on the trailing arm 5 to raise the furrow openers for transport.

Figure 3:
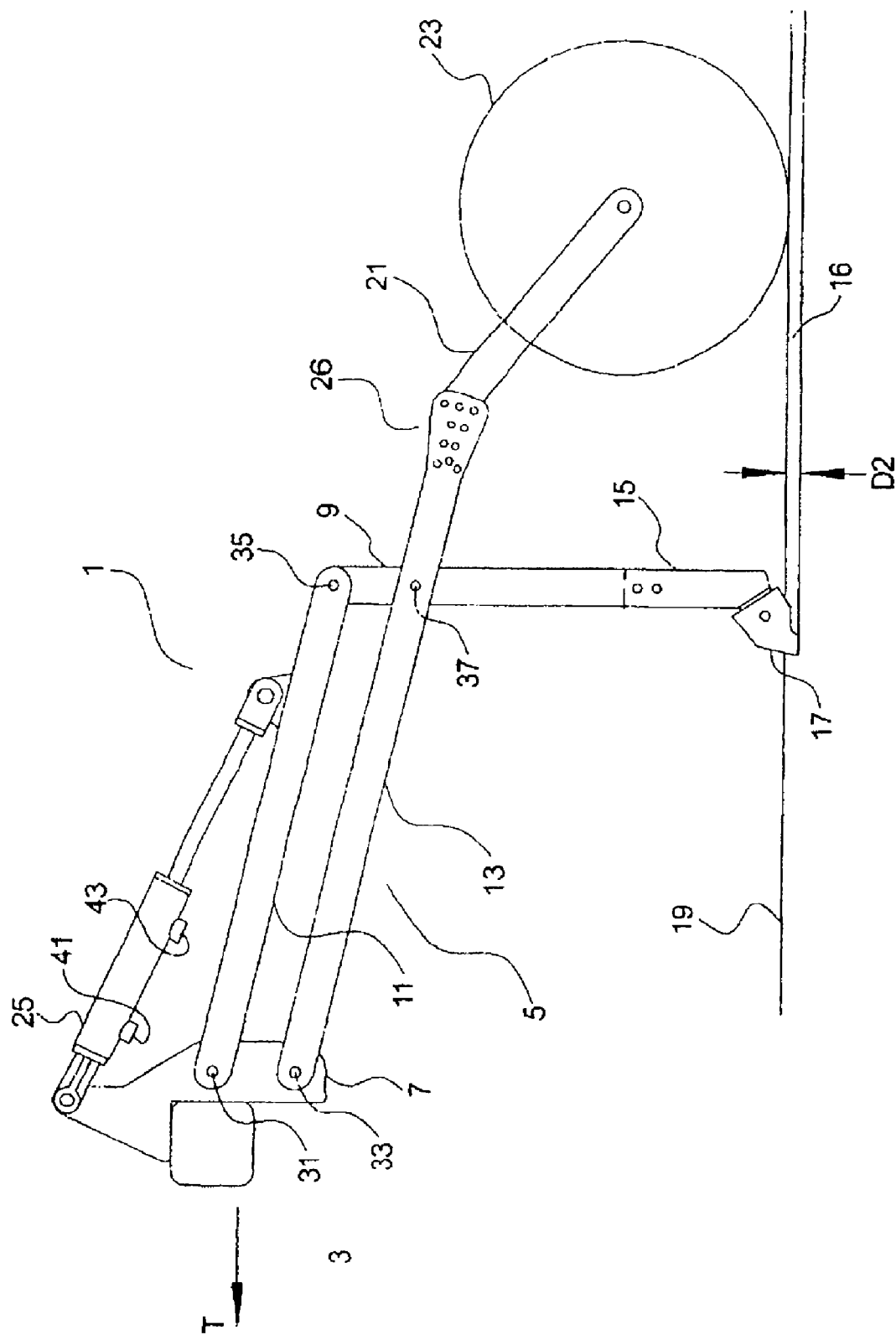
FIG. 3 is a schematic side view of the embodiment of FIG. 1 in a working mode where the packer wheel has moved downward relative to the frame from the working position shown in FIG. 1.

Since the packer wheel arm 21 is fixed with respect to the lower parallel arm member 13, as the packer wheel 23 moves down with respect to the frame 3 from the working position illustrated in FIG. 1 to the working position illustrated in FIG. 3, the depth of the furrow 16 is reduced from the depth D1 in FIG. 1 to the depth D2 in FIG. 3.

Figure 4:
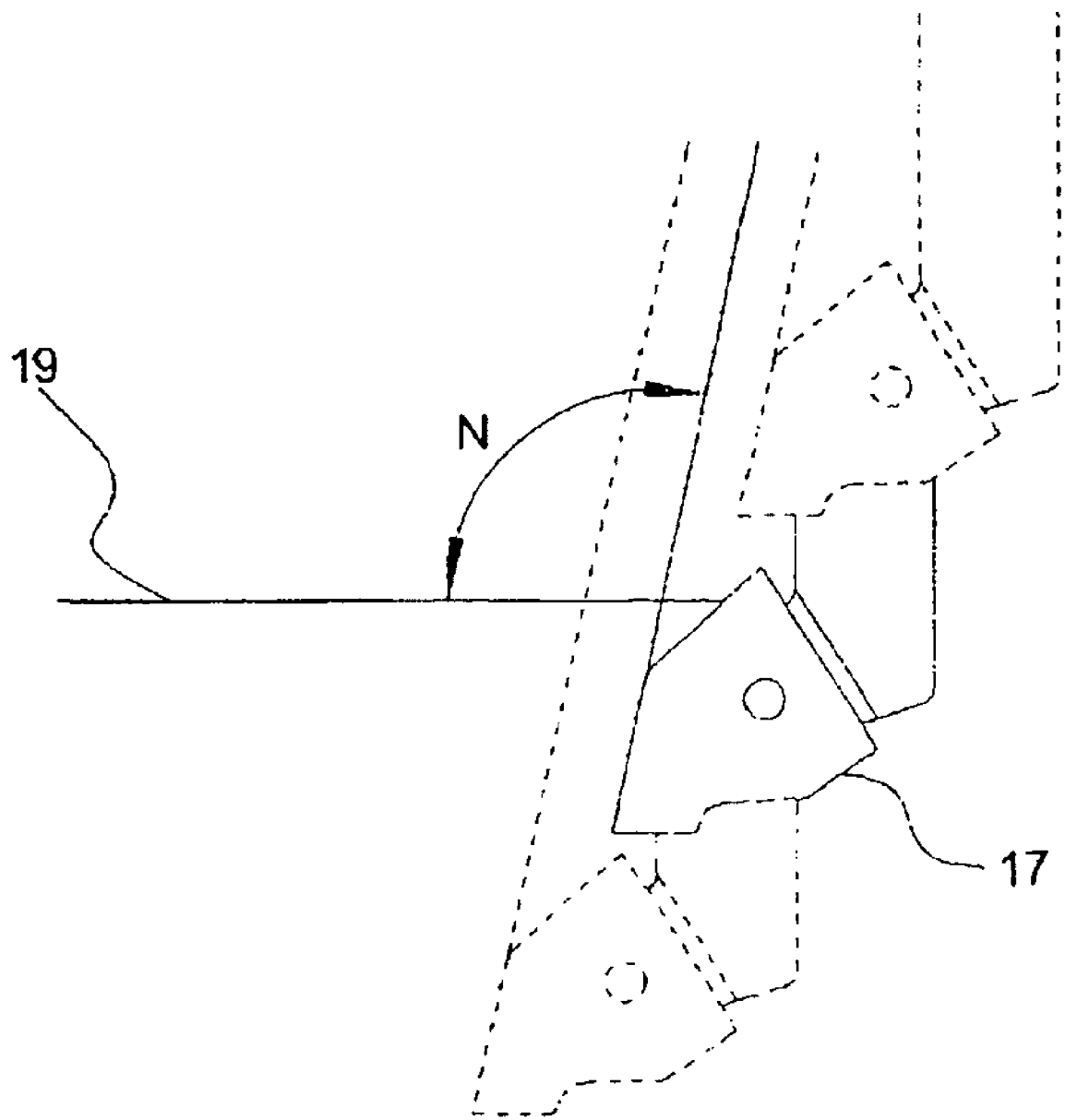
FIG. 4 schematically illustrates the presentation angle of the furrow opener of FIG. 1 with respect to the ground as the apparatus moves up and down relative to the implement frame.

Since the furrow opener 17 and the rear link 9 are fixed with respect to each other the operation of the parallel link assembly causes the presentation angle N of the furrow opener 17 with respect to the ground surface 19 to stay the same, as illustrated in FIG. 4, as the packer wheel 23 moves up and down with respect to the frame 3, such as between the positions illustrated in FIGS. 1 and 3.

Thus the furrow opener apparatus 1 makes a furrow 16 that varies in depth as the packer wheel moves up and down with respect to the implement frame 3, as in a conventional trailing arm furrow opener assembly, but unlike the conventional trailing arm furrow opener assembly the presentation angle remains constant, allowing the furrow opener to work at the preferred presentation angle N rather than through a range of presentation angles.

The furrow opener apparatus 1 can provide an additional advantage over conventional furrow opener assemblies. With conventional trailing arm furrow opener assemblies, it is desirable to have the distance from the frame to the ground at a substantially constant distance in order to maintain the presentation angle N during operation in an acceptable range. As the frame to ground distance varies in rolling terrain, the trailing arm moves up and down with respect to the frame. By keeping the frame to ground distance as consistent as possible, such as by using fixed wheels, the front end of the trailing arm is kept at substantially the same distance above the ground at all times, and on level ground the presentation angle N of the furrow opener is in the middle of an acceptable range. Then as the packer wheel moves the rear end of the trailing arm up and down in rolling terrain, the presentation angle moves in the acceptable range.

Similarly, maintaining the frame to ground distance constant in the conventional seeders keeps the depth of the furrow within an acceptable range as well. On level ground the presentation angle of the furrow opener is in the middle of its acceptable range and the depth of the furrow is also in the middle of its acceptable range, and as the packer wheel moves up and down in rolling terrain the depth of the furrow reduces or increases somewhat, but is kept within a reasonable range. In order to change the depth of the furrow, the relative vertical position of the furrow opener and packer wheel is varied, with an adjustment mechanism such as the adjustment mechanism 26 illustrated in FIGS. 1-3. A seeding implement may have a large number of furrow opener assemblies, and when it is desired to change the depth of the furrow, it is necessary to make an adjustment on each assembly, which can be an onerous and time consuming operation.

In the present apparatus 1, by keeping the presentation angle N the same as the furrow opener moves up and down through the whole range of vertical movement of the trailing arm, the depth of the furrow can be controlled by varying the distance from the implement frame to the ground surface 19. Thus moving the frame 3 to the vertical position with respect to the ground shown in FIG. 1, sets the depth of the furrow at D1 on level ground. As the packer wheel 23 moves up and down with respect to the frame 3, the depth of the furrow 16 will become slightly deeper or shallower but will remain within an acceptable range. If it is desired to reduce the depth of the furrow 16, the frame can be raised to the vertical position with respect to the ground surface 19 shown in FIG. 3, setting the depth of the furrow at the reduced depth D2 on level ground. Again the depth of the furrow 16 will become slightly deeper or shallower in rolling terrain, but will remain within an acceptable range. The presentation angle N remains the same and the furrow opener 17 will function the same in either position, in contrast to the prior art furrow opener assemblies.

Thus where the furrow opener apparatus 1 is mounted on a conventional implement frame where the wheels move up and down to vary the vertical position of the frame with respect to the ground surface 19, adjusting the depth of the furrow 16 can be done simply by adjusting the vertical position of the frame. The adjustment mechanism 26 may not be required at all in some applications, and in others could be used where large adjustments in furrow depth are required.

Figure 5:
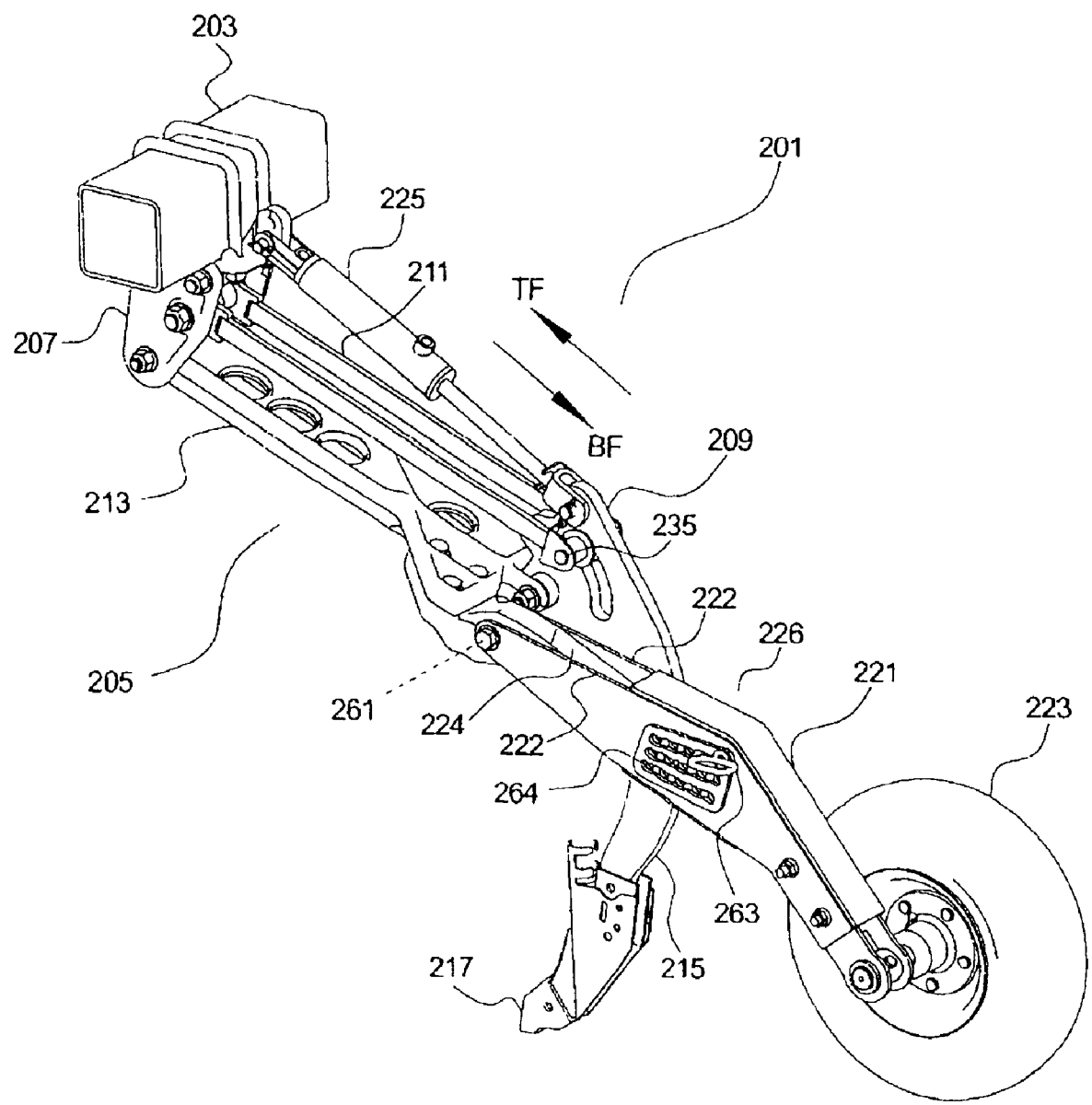
FIG. 5 is a left rear isometric view of an alternate embodiment of the apparatus of the invention shown in a working position.
Figure 6:
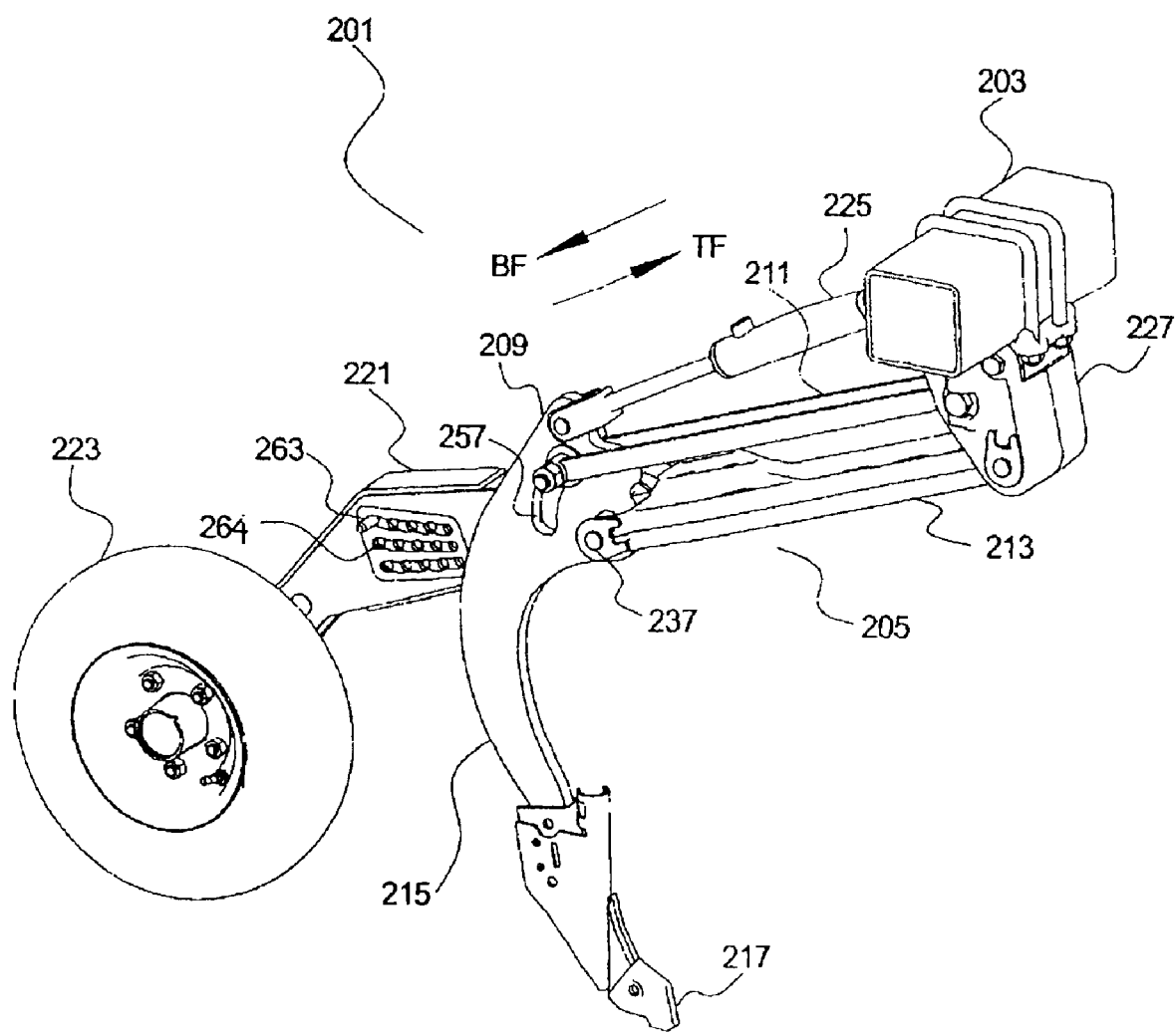
FIG. 6 is a front right isometric view of the embodiment of FIG. 5 shown in a working position.

An alternate embodiment of the furrow opener apparatus 201 is illustrated in FIG. 5. The parallel link assembly 205 comprises a front link 207 attachable to a lateral frame member 203, and a rear link 209 that is provided by the upper end of the furrow opener bracket 215. The furrow opener bracket 215 is pivotally attached to the lower parallel arm member 213 by lower bolt 237 which provides the lower rear pivot axis of the parallel link assembly 205.

The bias device, hydraulic cylinder 225, is pivotally attached to the top of the furrow opener bracket 215. A slot 257 is provided in the upper end of the furrow opener bracket 215. An upper bolt 235 extends through the slot 257 and the upper parallel arm member 211 to form the upper rear pivot axis of the parallel link assembly 205. The furrow opener bracket 215 pivots down about the lower bolt 237 in response to the rearward bias force BF exerted by the hydraulic cylinder 225 such that the top end of the slot 257 bears against the upper bolt 235 when in the working mode. The parallel link assembly 205 is thus formed when the apparatus is in the working mode by the upper and lower parallel arm members 211, 213 pivotally connected at front ends thereof to the front link 207, and pivotally connected at rear ends thereof to the rear link 209 provided by the upper end of the furrow opener bracket 215.

The bias force BF is transferred by the upper bolt 235 to the parallel link assembly 205 and thus to the packer wheel 223 to force the packer wheel 223 against the ground. Thus in the working mode the furrow opener 217 that is fixed to the bottom end of the furrow opener bracket 215, which in turn provides the rear link 209, is maintained in substantially constant fore and aft angular orientation as the parallel link assembly 205 moves up and down as the terrain varies.

When the hydraulic cylinder 225 exerts a transport force TF when in the transport mode to pivot the furrow opener bracket 215 upward about the lower bolt 237, a lug 210 on the top front side of the furrow opener bracket 215 bears against the top of the lower parallel arm member 213 and the transport force TF raises the parallel link assembly 205, including the furrow opener 217 and packer wheel 223. In tile transport position illustrated in FIG. 7, the upper bolt 235 extending through the slot 257 is in a mid portion of the slot 257 and the upper parallel arm member 211 is thus unloaded during transport.

The packer wheel arm 221 comprises arm plates 222 at a forward end thereof that are pivotally attached about a packer wheel arm axis 261 to an arm extension 224 fixed to and extending laterally and rearward from a rear portion of the lower parallel arm member 213. The arm extension 224 extends between the arm plates 222 to the depth adjusting mechanism 226 comprising a pin 263 extending through corresponding holes 264 in the arm plates 222 and arm extension 224.

Thus the depth adjustment pin 263 can be removed to allow the packer wheel arm 221 to pivot up or down with respect to the arm extension 224, and thus with respect to the lower parallel arm member 213, and then reinserted to fix the packer wheel arm 221 to the arm extension 224 to adjust the depth of the furrow made by the furrow opener 217.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A furrow opener apparatus adapted for attachment to a lateral frame member of an implement for travel over the ground in an operating travel direction, the apparatus comprising:
    a parallel link assembly comprising a front link adapted for substantially fixed attachment to the lateral frame member, a rear link, and upper and lower parallel arm members pivotally attached to the front and rear links such that, in a working mode, the rear link is maintained in a substantially constant fore and aft angular orientation as the upper and lower arm members pivot up and down about the front link;
    a furrow opener bracket attached to the rear link, and a furrow opener attached to a lower portion of the furrow opener bracket, the furrow opener operative to form a furrow when a bottom end thereof is engaged in the ground;
    a packer wheel arm fixed to one of the upper and lower parallel arm members and extending rearward from the rear link, and a packer wheel rotatably mounted to a rear portion of the packer wheel arm such that the packer wheel is substantially aligned with the furrow opener;
    a bias device operative to exert a downward bias force on the parallel link assembly when in the working mode;
    wherein the furrow opener is maintained in substantially rigid orientation with respect to the rear link when in the working mode.

2. The apparatus of claim 1 wherein the front link defines upper and lower front pivot axes and the rear link defines upper and lower rear pivot axes, and wherein the attachment to the frame member is such that the upper and lower front and rear pivot axes are oriented substantially horizontal and perpendicular to the operating travel direction, and wherein the upper arm member is pivotally attached to the front link about the upper front pivot axis and pivotally attached to the rear link about the upper rear pivot axis, and wherein the lower arm member is pivotally attached to the front link about the lower front pivot axis and is pivotally attached to the rear link about the lower rear pivot axis such that the upper and lower arm members are oriented substantially parallel to each other.

3. The apparatus of claim 1 wherein the bias device comprises a hydraulic cylinder.

4. The apparatus of claim 3 wherein the hydraulic cylinder is connectable to an active hydraulic source at a first port thereof when in working mode and the active hydraulic source is operative in the working mode to maintain a desired pressure in the hydraulic cylinder to exert a desired downward bias force on the parallel link assembly while allowing the hydraulic cylinder to extend and retract in response to forces exerted on the trailing arm.

5. The apparatus of claim 4 wherein the hydraulic cylinder is connectable to the active hydraulic source at a second port thereof when in a transport mode and the active hydraulic source is operative in transport mode to raise the parallel link assembly to a transport position.

6. The apparatus of claim 3 wherein the upper and lower parallel arm members are pivotally attached at rear ends thereof to an upper portion of the furrow opener bracket such that the rear link is provided by the upper portion of the furrow opener bracket.

7. The apparatus of claim 6 wherein the upper portion of the furrow opener bracket defines a slot and wherein the upper parallel arm member is pivotally attached to the furrow opener bracket by an upper bolt extending through the slot, and wherein the hydraulic cylinder is pivotally attached to a top end of the furrow opener bracket such that as the hydraulic cylinder exerts a force on the top end of the furrow opener bracket, a top end of the slot bears against the upper bolt to exert the downward bias force on the parallel link assembly.

8. The apparatus of claim 7 wherein the hydraulic cylinder exerts a transport force when in the transport mode to move the furrow opener bracket upward such that a portion of a top front side of the furrow opener bracket bears against the lower parallel arm member and raises the parallel link assembly to a transport position.

9. The apparatus of claim 1 wherein a vertical operating position of the furrow opener with respect to the packer wheel is adjustable to vary a depth of a corresponding furrow.

10. The apparatus of claim 9 wherein the packer wheel arm is pivotally attached to a selected one of the upper and lower parallel arm members about a packer wheel arm axis such that an angle of the packer wheel arm with respect to the selected parallel arm member can be adjusted to vary the depth of the furrows.

11. The apparatus of claim 1 wherein a depth of the furrow is varied by varying a vertical operating position of the lateral frame member with respect to the ground.

12. A seeding implement apparatus adapted for travel over the ground in an operating travel direction, the apparatus comprising:
  a lateral frame member;
  a front link substantially fixed to the lateral frame member, a rear link, and upper and lower parallel arm members pivotally attached to the front and rear links such that, in a working mode, the rear link is maintained in a substantially constant fore and aft angular orientation as the upper and lower arm members pivot up and down about the front link;
  a furrow opener bracket attached to the rear link, and a furrow opener attached to a lower portion of the furrow opener bracket, the furrow opener operative to form a furrow when a bottom end thereof is engaged in the ground;
  a packer wheel arm fixed to one of the upper and lower parallel aim members and extending rearward from the rear link, and a packer wheel rotatably mounted to a rear portion of the packer wheel arm such that the packer wheel is substantially aligned with the furrow opener;
  a bias device operative to exert a downward bias force on the parallel link assembly when in the working mode;
  wherein the furrow opener is maintained in substantially rigid orientation with respect to the rear link when in the working mode.

13. The apparatus of claim 12 wherein the front link defines upper and lower front pivot axes and the rear link defines upper and lower rear pivot axes, and wherein the attachment to the frame member is such that the upper and lower front and rear pivot axes are oriented substantially horizontal and perpendicular to the operating travel direction, and wherein the upper arm member is pivotally attached to the front link about the upper front pivot axis and pivotally attached to the rear link about the upper rear pivot axis, and wherein the lower arm member is pivotally attached to the front link about the lower front pivot axis and is pivotally attached to the rear link about the lower rear pivot axis such that the upper and lower arm members are oriented substantially parallel to each other.

14. The apparatus of claim 12 wherein the bias device comprises a hydraulic cylinder.

15. The apparatus of claim 14 wherein the hydraulic cylinder is connectable to an active hydraulic source at a first port thereof when in working mode and the active hydraulic source is operative in the working mode to maintain a desired pressure in the hydraulic cylinder to exert a desired downward bias force on the parallel link assembly while allowing the hydraulic cylinder to extend and retract in response to forces exerted on the trailing arm.

16. The apparatus of claim 15 wherein the hydraulic cylinder is connectable to the active hydraulic source at a second port thereof when in a transport mode and the active hydraulic source is operative in transport mode to raise the parallel link assembly to a transport position.

17. The apparatus of claim 14 wherein the upper and lower parallel arm members are pivotally attached at rear ends thereof to an upper portion of the furrow opener bracket such that the rear link is provided by the upper portion of the furrow opener bracket.

18. The apparatus of claim 17 wherein the upper portion of the furrow opener bracket defines a slot and wherein the upper parallel arm member is pivotally attached to the furrow opener bracket by an upper bolt extending through the slot, and wherein the hydraulic cylinder is pivotally attached to a top end of the furrow opener bracket such that as the hydraulic cylinder exerts a force on the top end of the furrow opener bracket, a top end of the slot bears against the upper bolt to exert the downward bias force on the parallel link assembly.

19. The apparatus of claim 18 wherein the hydraulic cylinder exerts a transport force when in the transport mode to move the furrow opener bracket upward such that a portion of a top front side of the furrow opener bracket bears against the lower parallel arm member and raises the parallel link assembly to a transport position.

20. The apparatus of claim 12 wherein a vertical operating position of the furrow opener with respect to the packer wheel is adjustable to vary a depth of a corresponding furrow.

21. The apparatus of claim 20 wherein the packer wheel arm is pivotally attached to a selected one of the upper and lower parallel arm members about a packer wheel arm axis such that an angle of the packer wheel arm with respect to the selected parallel arm member can be adjusted to vary the depth of the furrows.

22. The apparatus of claim 12 wherein the lateral frame member is mounted on wheels for travel over the ground and wherein a vertical position of the lateral frame member with respect to the ground can be varied by moving the wheels up and down with respect to the lateral frame member.

23. The apparatus of claim 22 wherein the depth of the furrow is varied by moving the wheels up and down with respect to the lateral frame member.

* * * * *

UNITED STATES PATENT AND TRADEMARK OFFICE
CERTIFICATE OF CORRECTION

PATENT NO. : 7,549,481 B2  Page 1 of 1
APPLICATION NO. : 12/057922
DATED : June 23, 2009
INVENTOR(S) : Devin Lung and Mark Cresswell It is certified that error appears in the above-identified patent and that said Letters Patent is hereby corrected as shown below:

Claim 12, line 59 col. 9: after "lower parallel", please delete "aim" and replace with "arm".

Signed and Sealed this

Eighteenth Day of August, 2009

David J. Kappos
*Director of the United States Patent and Trademark Office*